United States Patent
Morgan

[11] Patent Number: 5,812,263
[45] Date of Patent: Sep. 22, 1998

[54] ACCURACY OF A FIBER OPTIC GYRO

[76] Inventor: Avery A. Morgan, 2097 Tanglewood Dr. N.E., St. Petersberg, Fla. 33702

[21] Appl. No.: 771,092
[22] Filed: Dec. 20, 1996
[51] Int. Cl.[6] .................................................. G01C 19/64
[52] U.S. Cl. ............................................. 356/350
[58] Field of Search ............................................. 356/350

[56] References Cited

U.S. PATENT DOCUMENTS 4,865,449 9/1989 Lefevre ..................... 356/350
5,159,575 10/1992 Winston, Jr. ............... 356/350

*Primary Examiner*—Vincent P. McGraw
*Attorney, Agent, or Firm*—Robert E. Greenstien

[57] ABSTRACT

In a fiber optic gyro (FOG) with a photo-diode phase detector that produces a detector signal that is supplied to an A/D converter to generate a FOG information signal for use in a signal processor to produce a FOG control signal based on FOG controller equations, the photo-diode out is summed with a feedback signal from the signal processor to reduce a DC offset in the input to the A/D converter.

9 Claims, 3 Drawing Sheets

ACCURACY OF A FIBER OPTIC GYRO

TECHNICAL FIELD OF THE INVENTION

This invention relates to fiber optic gyros ("FOG"), in particular techniques for improving the accuracy of a fiber optic gyro.

BACKGROUND OF THE INVENTION

In a typical fiber optics gyro, a light source, such as a laser, produces a light beam that is supplied to a coupler to transmit the light beam to a beam splitter where the light beam is divided, traveling along two paths to the ends of a fiber coil. The light travels around the coil in both directions and if the coil is rotating around an axis perpendicular to the coil's plane, the light propagated in one direction travels a little further than the light propagated in the other direction, producing a phase shift between the two beams that can be detected when the refractive index of the path is modulated. The returning light passes through the beam splitter to a coupler where a pick off transmits the light to a photo-diode that produces an analog signal, the magnitude of which changes with the phase shift of the counter-rotating light beams in the fiber optic coil.

The way that the fiber optics gyro measures rate can be explained with FIGS. 1 and 4. In FIG. 4, the power output of the photo-diode is plotted against the relative phase between the two light beams, called the "detector phase". The detector phase is the sum of the phase induced by gyro rotation, called the "sagnac phase" and the phase induced by the controller, called the "controller phase". The controller is designed to cause a zero average detector phase. With balanced condition, the average controller phase, known in the digital signal processor, provides a measurement of the sagnac phase and thus a measurement of the gyro rotation.

The controller provides a digital output that is converted through a D/A converter into a voltage that is applied to the phase modulator. A voltage applied to the phase modulator modifies the coefficient of refraction in a section of the light path to cause a phase shift on the light beams through that section. The result on the the light beam exiting the fiber loop appears at the photo-diode τ seconds before that of the light applied to the fiber loop, causing a relative phase shift between the two light beams at the photo-diode. The response to a step change in phase modulator voltage is a detector phase that is proportional to the phase modulator voltage, and who duration is τ seconds, the transition time of light around the optical loop. Phase modulator voltage oscillations with a period of 2 τ seconds will cause proportional detector phase shifts with the same period. An example of such an oscillation is the case in which the phase modulation voltage is stepped each τ seconds. Variations in the amplitude and direction of these steps provides the fine control of detector phase that is required to control the average detector phase to zero.

The means for controlling the average detector phase to zero may be understood through FIG. 4. The approach is to apply a phase modulator voltage so that the detector phase steps back-and-forth between points 210 and 213. For this condition, the detector power transitions back-and-forth between points 201 and 204. The detector power at point 201 is subtracted from the detector power at point 204 to provide an error signal. For the balanced condition, in which the average detector phase is zero, this error signal will be zero. If a disturbance occurs, such that the average detector phase is not zero, such shown in FIG. 4, with the detector phase stepping back-and-forth between points 210' and 213', the error signal would no longer be zero. In this case, the error signal would be the detector power at point 201' subtracted from the detector power at point 204'. This error signal would be fed back through the digital electronics (signal processor) to adjust the phase modulator voltage, causing the required change in the detector phase to control the error signal to zero. It is well understood that any error in the measurement of detector power which is oscillatory with a period of 2 τ cannot be distinguished from the consequences of a gyro rotation rate, and thus would cause a bias error in the gyro output.

The detector power is sampled each τ seconds and converted from an analog signal to a digital word. The error signal is small compared to the maximum detector output. Referring to FIG. 4, the sampling of detector power must occur during the τ seconds when the detector phase is at points 210 and 213, avoiding the transition interval between these points. Various sampling techniques are typically employed, such as multiple samples, to reduce the consequences of photo-diode noise. As shown in FIG. 2, when the control loop is balanced, the signal to the A/D converter is small in the sampling region 80, but can have large transient values when moving between control points, such as points 201 and 204. Certain variations of the control strategy can cause these transients to have components of oscillations with a period of 2 τ (the period of the proper frequency). To avoid bias errors, the electronics must not introduce any response characteristic that will cause part of the oscillatory signal to appear in the region in which detector power is sampled. Such a transient response will occur in the circuits that are presently used to provide a signal that is centered in the range of the A/D converter. The reason for these centering circuits is to improve the resolution of the A/D converter by decreasing the range. The most widely used centering circuit includes a capacitor in series with a DC amplifier. The capacitor is charged by the detector power transient and discharges during the subsequent period in which the detector is sampled, the result being a drift error.

DISCLOSURE OF THE INVENTION

An object of the present invention is to improve the accuracy of a fiber optic gyro.

According to the invention, the photo diode output is offset with a feedback signal based on the photo-diode output accumulated at successive intervals τ seconds apart.

According the invention, the photo diode output is supplied to an input of a differential amplifier with an output that is applied to an analog to digital converter to produce digital signals u at a first interval and u' at a second interval that are applied to a signal processor. The signal processor generates a signal da_in, which is the sum of u and u' scaled and added to the previous value of da_in and which is supplied to a digital to analog converter to produce a value da_out that is applied to the inverted input on the differential amplifier.

A feature of the invention is that it can be added to existing gyros using digital signal processing and associated interfaces for processing the output from a photo diode.

A feature of the invention is that it provides a correction without affecting the information path of the fiber optics gyro.

Another feature is that the dynamic input range to the A/D converter can be reduced without clipping the detector signal.

Other objects, benefits and features of the invention will be apparent from the following discussion of one or more embodiments.

BRIEF DESCRIPTION OF THE DRAWING

FIG. 5 shows an alternative embodiment for providing a feedback signal to reduce the detector offset.

BEST MODE FOR CARRYING OUT THE INVENTION

Figure 1:
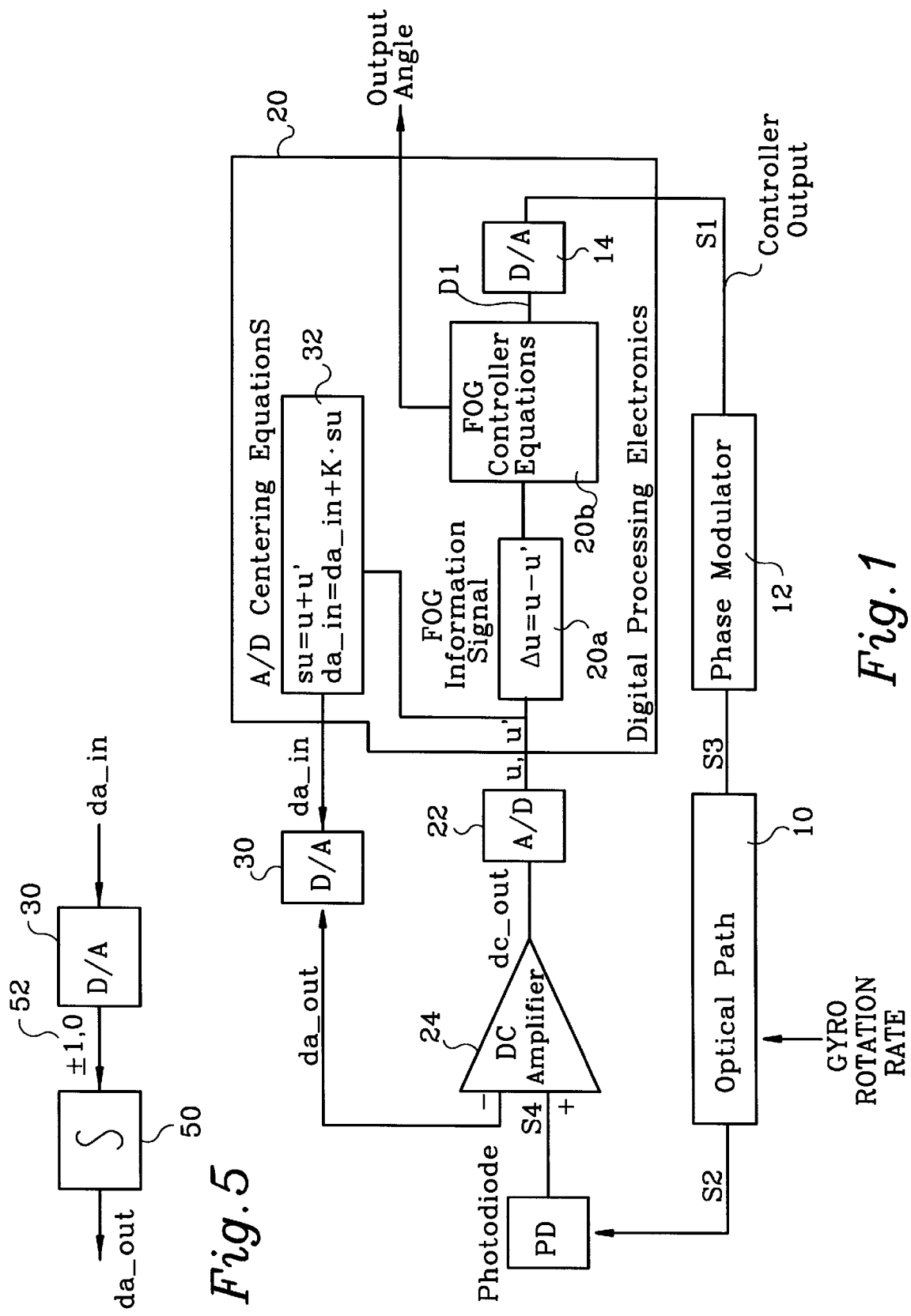
FIG. 1 is a functional block diagram of a fiber optic gyro controller embodying the present invention.
Figure 2:
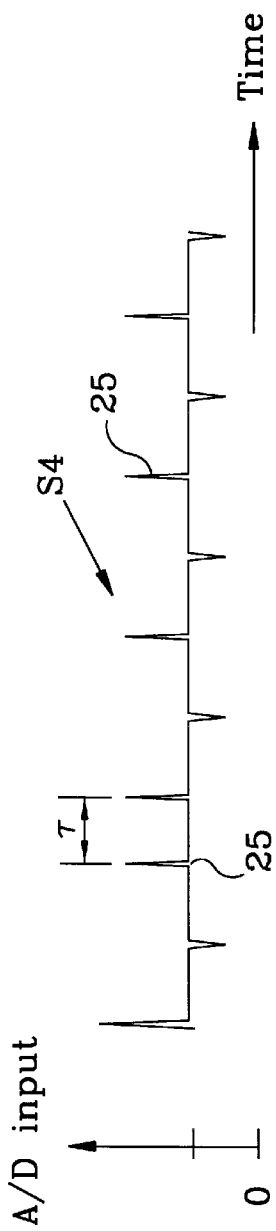
FIG. 2 is wave form showing the transients produced in the photo diode output from the phase modulation.
Figure 4:
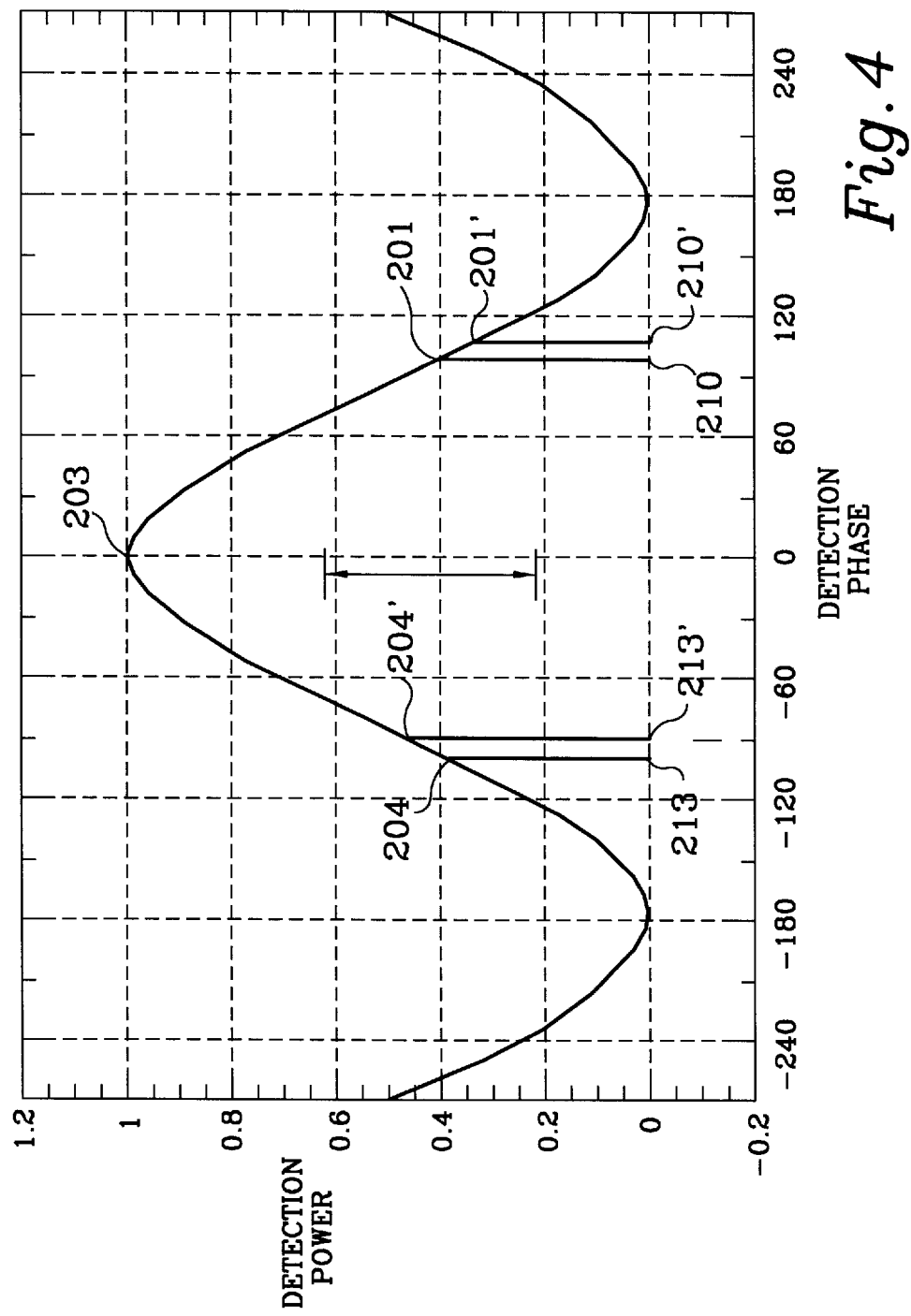
FIG. 4 shows the detector power as a function of phase.

Referring to FIG. 1, the optical path 10 corresponds functionally to block 10 in U.S. Pat. No. 5,513,003 incorporated by reference, except for the modulator 50, which corresponds with the phase modulator block 12. A D/A 14 provides a control signal S1, to control the phase modulation, that includes a square wave, which, it should be understood is the sum of the signals on lines 109 and 119 in U.S. Pat. No. 5,513,003. The output S2 from the optical path is applied to a photo-diode 16, whose output response is shown in FIG. 4. As explained previously the forced phase shift in the light moves the output point on the curve between opposite sides of the peak at 203, which produces the transients or spikes S4, shown in FIG. 2, which are spaced apart by $\tau$.

The controller contains a signal processor 20 that is programmed to carry out operations to produce a digital signal D1 based on the "Fiber Optic Gyro Equations" operation to produce the signal S1 as a function of the "FOG Information Signal" at block 20a. Those program operations are known in the art and have been shown as software blocks 20a and 20b in the signal processor 20 where they are carried out by suitable processor programming. The cyclical production of the signal D1 every $\tau$ seconds twice the proper frequency.

The A/D converter 22 receives an output from a differential DC amplifier 24, having one of its inputs the signal S4 from the photo diode PD. The other input da_out is applied to the inverted or negative input on the amplifier 24 from a D/A 30, da_out manifesting the analog value of a digital signal da_in that is supplied from the signal processor 20 using the computation 32. Da_in is computed at each sampling time using the value su, which is the sum of the current u and previous value u'. The value su is multiplied by control constant k with the result summed with the current value of da_in to provide an updated value of da_in. The resulting value da_out is subtracted from the value of S4 at the amplifier 24 to produce the value dc_out that is supplied to the A/D 22.

Figure 3:
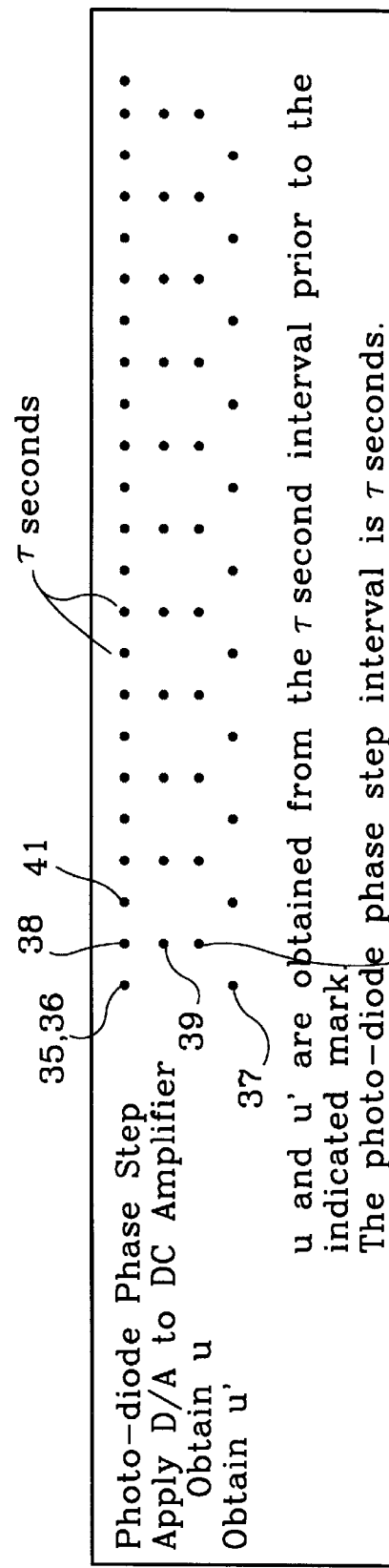
FIG. 3 is a timing chart showing the production, on cyclically basis of the signals and values used to remove the drift error according to the present invention.

It should be understood that the application of the correction da_out to the amplifier 24 occurs on each modulation step or photo-diode phase step in the transition between points 201 and 204. Signal generation is shown as a dot 35 in FIG. 3, each being $\tau$ seconds apart. At first step 36, the value of u' is obtained at 37. At point 38, $\tau$ seconds later, the next phase step takes place (which would cause a transient 25 in signal S4). Simultaneously, at point 39 the value of da_out is applied to the DC amplifier 24 at 40 and the value for u is obtained. At the next phase step 41, the value of u' is obtained. The iterative process continues in this way, with the value of da_out being updated every other phase step using the previous value. Over several cycles, the offset in input to the A/D 22 is reduced reducing the risk of clipping and the required input dynamic range for the A/D 22.

Referring to FIG. 5, instead having da_out as discrete analog signal, it can comprise the output from an integrator 50 that receives a one bit word 52 with one of three values, zero or +/– one, depending on the magnitude of da_in. Depending on the successive values of the word 52, produced every $\tau$ seconds, da_out would increase or decrease.

Although the present invention has been described with reference to preferred embodiments one of ordinary skill in the art will be able to make modifications and changes, in addition to any already described, in whole or in part to the components and devices described above to carry out the invention without departing from the spirit and scope of the invention.

I claim:

1. A fiber optic gyro comprising a signal processor to control the phase of light applied to an optical phase detector supplying a signal to an A/D converter, characterized in that:

the signal processing means comprises means for producing first signals that represents the sum of a second signal and a third signal, the second signal being the output from the A/D converter at a first time, the third signal being the output from the A/D converter at a second subsequent time; and amplifier means for producing a fourth signal that represents the difference between the first signal and the output from the photo-diode and for applying the fourth signal to the A/D converter.

2. The fiber optic gyro described in claim 1, further characterized in that:

the interval between the first and second times is the transit time of light in an optical path carrying light applied to the optical phase detector.

3. The fiber optic gyro described in claim 2, further characterized in that:

the time between the first signals is an even integer multiple of the interval between the first and second times.

4. The fiber optic gyro described in claim 1, further characterized in that:

the amplifier means comprises a differential DC amplifier.

5. The fiber optic gyro described in claim 1, further characterized by:

integration means for producing the first signal by integrating a signal based on the sum of the second and third signals.

6. A fiber optic gyro comprising a photo-detector, characterized by:

first means for receiving an output signal from the photo-detector and producing a detector output signal comprising an error signal manifesting a detected phase shift and a bias signal manifesting modulation of light received by the photo-detector;

modulation means for changing the phase relationship of light received by the photo-detector to provide a selected power for the light received by the photo-detector as a function of the phase signal; and adjustment means for sampling the detector output at successive intervals to determine a difference in the detector output and to provide to the first means an offset signal that is increased at each of said successive intervals based on the magnitude of said difference to reduce the bias signal.

7. The fiber optic gyro described in claim 6, further characterized in that:

the successive intervals are spaced apart by the time it takes light to transit a fiber optic path carrying light to the photo-detector.

8. A method for operating a fiber optic gyro characterized by:

receiving an output signal from a photo-detector and producing a detector output signal comprising an error signal manifesting a detected phase shift and a bias signal manifesting modulation of light received by the photo-detector;

changing the phase relationship of light received by the photo-detector to provide a selected power for the light received by the photo-detector as a function of the phase signal; and sampling the detector output at successive intervals to determine a difference in the detector output and to provide to the first means an offset signal that is increased at each of said successive intervals as function of the magnitude of said difference to reduce the bias signal.

9. The method described in claim 8, further characterized in that:

the duration of each successive interval is the transit time for light in a fiber optic path carrying light to the photo-detector.

* * * * *